United States Patent [19]
Kawai

[11] Patent Number: 4,995,571
[45] Date of Patent: Feb. 26, 1991

[54] LOW TORQUE EFFECT FISHING REEL

[75] Inventor: Michiki Kawai, Tokyo, Japan

[73] Assignee: Daiwa Seiko, Inc., Tokyo, Japan

[21] Appl. No.: 394,318

[22] Filed: Aug. 11, 1989

Related U.S. Application Data

[63] Continuation of Ser. No. 182,506, Apr. 18, 1988, abandoned.

[30] Foreign Application Priority Data

Apr. 17, 1987 [JP] Japan ............................ 62-58330[U]

[51] Int. Cl.⁵ ............................................ A01K 89/015
[52] U.S. Cl. ..................................... 242/249; 242/310
[58] Field of Search ............... 242/310, 317, 318, 249, 242/257, 259, 260, 261, 262

[56] References Cited

U.S. PATENT DOCUMENTS

| 546,633 | 9/1895 | Arnold | 242/259 |
| 641,906 | 1/1900 | Trabue | 242/256 |
| 715,274 | 12/1902 | Konigsberg | 242/259 |
| 2,182,423 | 12/1939 | Cabassa | 242/270 |
| 2,648,506 | 8/1953 | Kirby | 242/266 |
| 3,226,052 | 12/1965 | King | 242/260 |
| 4,482,106 | 11/1984 | Kovalovsky | 242/259 |

FOREIGN PATENT DOCUMENTS 61-118255 7/1986 Japan .

Primary Examiner—Katherine Matecki
Attorney, Agent, or Firm—Cushman, Darby & Cushman

[57] ABSTRACT

A low torque effect fishing reel in which an imaginary line drawn to perpendicularly intersect both the spool and handle shaft axes intersects the fishing rod axis at substantially a right angle. Additionally, the handle shaft axis is arranged so as to be nearly coincident with the reel mounting surface of the fishing rod.

3 Claims, 3 Drawing Sheets

LOW TORQUE EFFECT FISHING REEL

FIELD OF THE INVENTION

This is a continuation of application Ser. No. 182,506, filed Apr. 18, 1988, which was abandoned upon the filing hereof.

The present fishing reel relates to an improvement in fishing reels wherein the rotational torque exerted by a fishing reel operator on the fishing rod on which the reel is mounted in substantially reduced. More particularly, this invention relates to a particular orientation and positioning of the respective spool and handle shaft axes of a fishing reel with respect to the axis of the fishing rod on which the reel is mounted.

BACKGROUND OF THE INVENTION

In a typical prior art fishing reel, as disclosed in U.S. Pat. No. 2,181,259, the handle shaft of the fishing reel is located substantially forward of the position of the associated spool. Thus, an imaginary line extending perpendicularly to both of the handle shaft and spool shaft axes intersects the axis of the fishing rod at an oblique angle. Also, the distance between the handle shaft and the rod mounting portion of the reel frame which secures the reel to the fishing rod, is relatively long.

This configuration creates a substantial amount of torque on the fishing rod during operation of the reel. That is, winding of the handle shaft so as to draw fishing line onto the spool of the fishing reel creates an awkward rightward and leftward swing to the fishing rod and reel combination. Such an action creates fatigue in the operator's arms, wrists, and hands and further impairs enjoyment of the fishing sport. In extreme cases, this excessive rightward and leftward torque may make the holding of the reel quite unstable and further render the operation of such a reel to be quite difficult after prolonged use.

SUMMARY OF THE INVENTION

The present invention seeks to avoid the problems associated with the geometric configuration of the prior art fishing reels discussed above. Particularly, a fishing reel according to the present invention has the respective axes of the spool and handle shaft arranged in a manner which substantially eliminates the undesirable torque effects of operating a fishing reel.

A fishing reel according to the present invention includes a spool shaft and handle shaft oriented such that a line extended so as to be perpendicular and at an intersection to the axes of these shafts intersects the axis of the fishing rod at substantially a right angle thereto. In this manner, the torque effect of the handle shaft gearing which drives the pinion of the spool shaft is substantially eliminated as a torque acting so as to twist the fishing rod in the hands of an operator.

An additional feature of the present invention is that the axis of the handle shaft is positioned so as to be substantially coincident with an upper surface of the fishing rod on which the reel is mounted. This positioning of the handle shaft axis with respect to the mounting surface of the fishing rod substantially reduces the moment arm, i.e., the distance between the handle shaft axis and the axis of the rod, about which the torque exerted by twisting the handle shaft can act to twist the fishing rod.

These and other objects of the invention as well as the novel features thereof will become apparent by reference to the specification, including the claims and drawings which form a part thereof.

DETAILED DESCRIPTION OF THE PREFERRED EMBODIMENT

Figure 1:
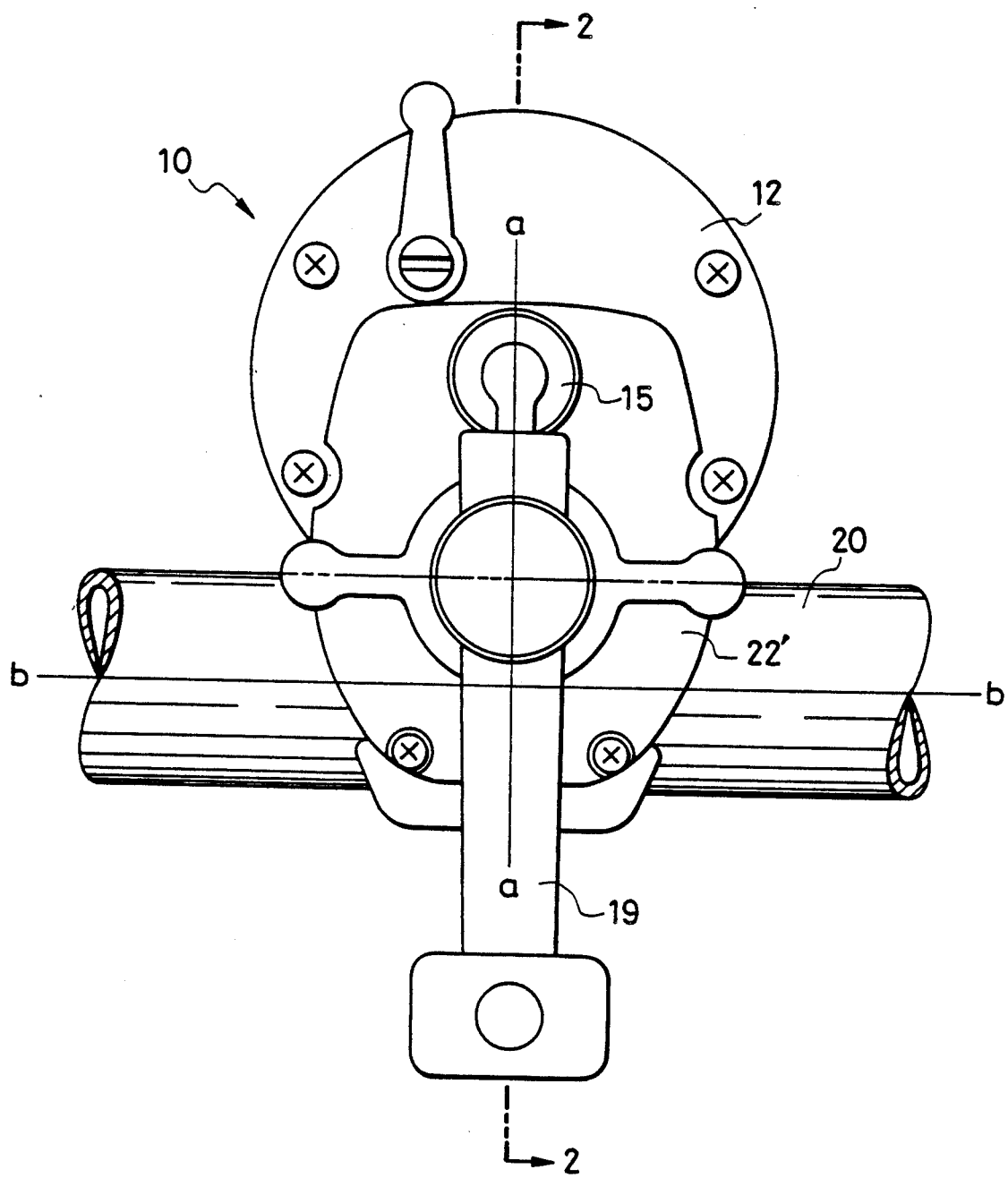
FIG. 1 is a side elevational view of a fishing reel according to the present invention.

The fishing reel according to the present invention will be described with reference to the embodiment shown in FIGS. 1 and 2.

Fishing reel 10 includes a spool 14 enclosed between side plate members 12 and 13. Spool 14 is mounted for positive rotation with spool shaft 15. Spool shaft 15 is contained within bearings mounted in each of the side plates 12 and 13. The spool shaft rotates freely in these bearings and has a drive pinion 16 mounted thereon intermeshingly engaged with driving gear 18. Driving gear 18 is mounted for fixed rotation with handle shaft 17 which is in turn mounted for rotation within the lower portion 22 of side plate 12. Handle shaft 17 is driven by an operator through handle 19.

The fishing reel also includes frame member 11 which serves to interconnect and support side plate members 12 and 13 and also includes base portion 21. Base portion 21 incorporates mounting brackets and associated fasteners to attach the fishing reel to a fishing rod 20.

As shown in FIG. 1, an imaginary line a—a drawn perpendicularly through the center of both of the separate axes of the spool shaft 15 and handle shaft 17 intersects the axis b—b of fishing rod 20 at substantially a right angle. In this manner, the excess torque effects of operating the fishing reel are substantially reduced.

Figure 2:
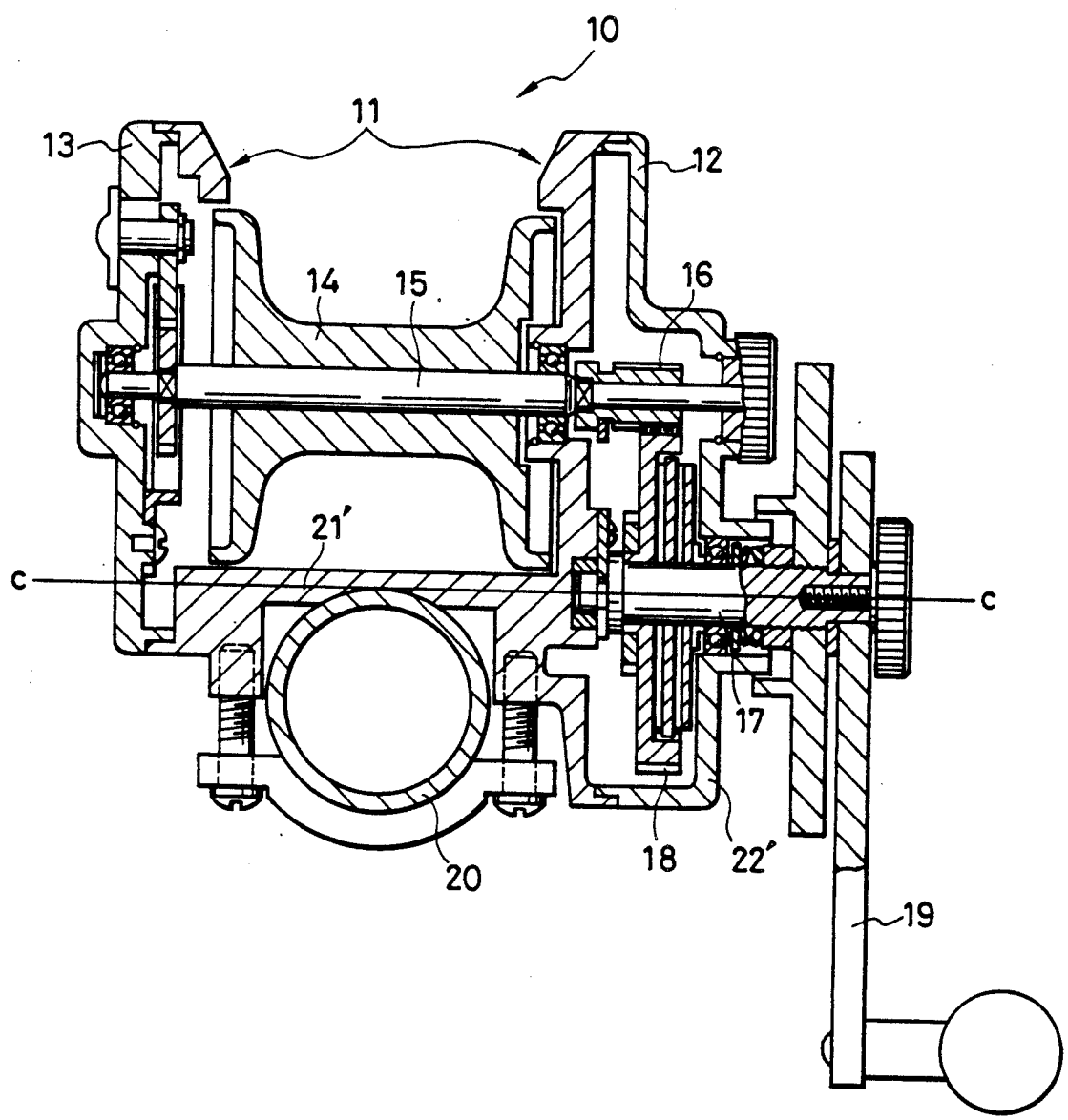
FIG. 2 is a sectional view of the fishing reel shown in FIG. 1 along line 2—2.

As shown in FIG. 2, the axis c—c of handle shaft 17 is positioned so as to be substantially coincident with an upper surface of fishing rod 20 on which the fishing reel is mounted, the axis c—c thus penetrating the reel mounting surface. The positioning of axis c—c in close proximity to the surface, and hence the central axis, of fishing rod 20 reduces the moment arm with which the operational torque can act to rotate handle shaft 17 around fishing rod axis b—b. In this manner, the excessive torque characteristics of operating a fishing reel according to the present invention are even further reduced.

Figure 3:
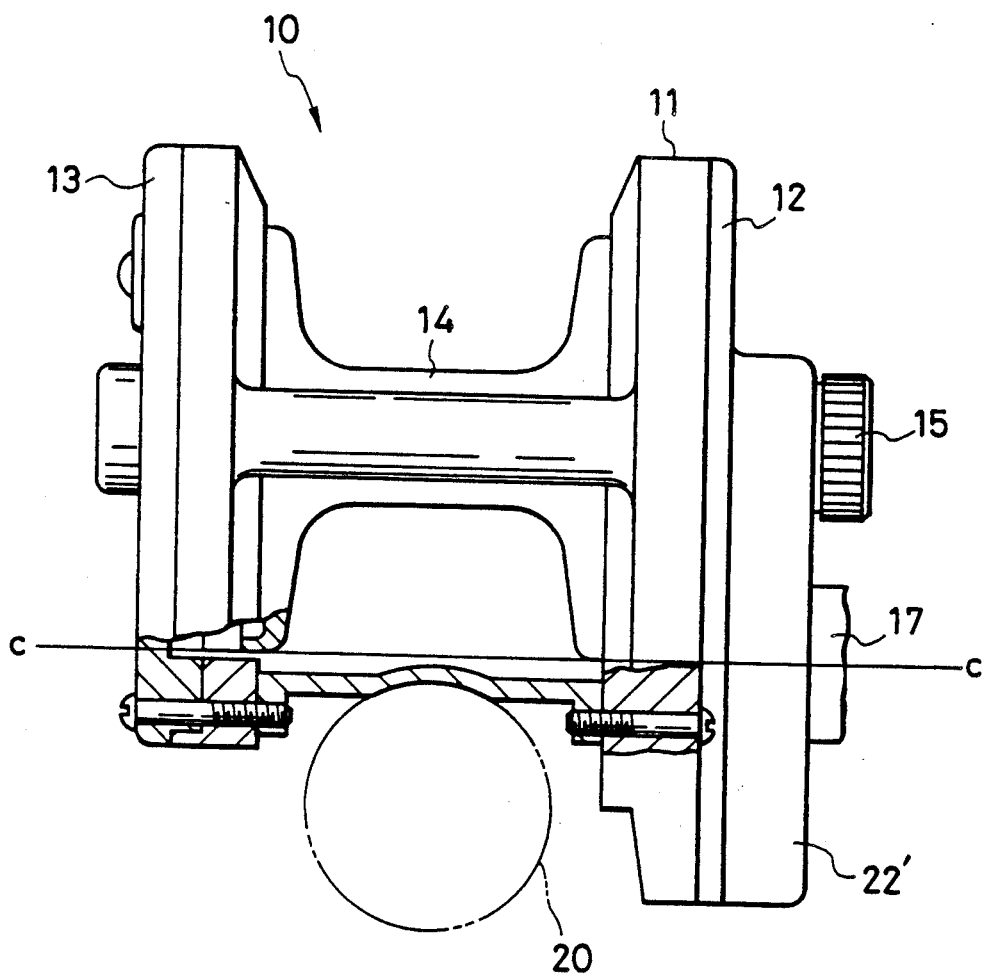
FIG. 3 shows a front partial section view of an alternative embodiment of a fishing reel according to the present invention.

FIG. 3 shows a fishing reel according to the present invention wherein the axis c—c of handle shaft 17 is positioned slightly removed from an upper surface of fishing rod 20. Although this configuration is less desirable than the configuration shown in FIG. 1, as long as the axis of the handle shaft is maintained within a range of approximately 5 to 6 millimeters from the mounting surface of the rod, the torque effects are still substantially minimized.

In further alternative embodiments, not presently shown, the axis of the handle shaft may penetrate the reel mounting surface and extend beneath the top surface of a fishing rod, but still be maintained within a distance of 5 to 6 millimeters from this top surface. In this modified configuration, satisfactory results are still obtained.

In operation, a fishing reel incorporating the features from the present invention, i.e., the intersection of a line drawn to perpendicularly intersect the respective handle shaft, spool shaft, and fishing rod axes, and the positioning of the handle shaft axis closely to the mounting surface of the fishing rod, is substantially less likely to exert excessive torque rotatively about the axis of a fishing rod. In this manner, a person engaged in fishing can stably rotate and handle the fishing rod and reel smoothly and easily. This is particularly the case when a fishing reel according to the present invention is a high speed gear ratio reel wherein the diameter of the driving gear 18 is larger than the diameter of pinion gear 16 so as to increase the rotational speed of the pinion with respect to the drive gear. By reducing the undesirable torque effects around the axis of the fishing rod, high speed gearing ratios for winding the spool can be used without ill effect to the operator of the fishing reel.

While I have described the invention in connection with a specific embodiment thereof, it is to be clearly understood that this is done only by way of example, and not as a limitation to the scope of our invention as set forth in the objects thereof and in the appended claims.

What is claimed is:

1. A fishing reel comprising:
   a fishing rod having a reel mounting surface and a longitudinal axis;
   spool means for winding fishing line, said spool means having a longitudinal axis;
   handle shaft means operatively coupled to said spool means for rotating said spool means to take up fishing line thereon, said handle shaft means having a central, longitudinal axis;
   transmission means for operatively connecting said handle shaft means to said spool means;
   frame means for rotatably supporting said spool means and said handle shaft means and for housing said transmission means, said frame means including a rod mounting base portion formed integrally therewith at a lower portion thereof and having a mounting surface for engaging said mounting surface of said fishing rod, said handle shaft means being mounted to said frame means so that the central, longitudinal axis thereof penetrates said mounting surface of said base portion so as to define a means for substantially reducing rotational torque acting on the fishing rod when said handle shaft is rotated relative to said frame means, wherein,
   an imaginary perpendicular line extended through said longitudinal axis of said spool means and said central, longitudinal axis of said handle shaft means intersects said longitudinal axis of said fishing rod at substantially a right angle thereto.

2. A fishing reel as in claim 1, wherein:
   said spool means includes a shaft along the axis of said spool means and said transmission means comprises a pinion gear mounted for rotation with said spool shaft, said pinion being driven by a drive gear mounted for rotation with said handle shaft means.

3. A fishing reel as in claim 2, wherein:
   said transmission means comprises a high speed transmission wherein a speed ratio between said drive gear and pinion gear exceeds 1:1.

* * * * *